(12) United States Patent
Wang

(10) Patent No.: US 9,270,166 B2
(45) Date of Patent: Feb. 23, 2016

(54) POWER FACTOR IMPROVEMENT CIRCUIT

(71) Applicant: TDK Corporation, Minato-ku, Tokyo (JP)

(72) Inventor: YueQing Wang, Shaghai (CN)

(73) Assignee: TDK Corporation (JP)

( * ) Notice: Subject to any disclaimer, the term of this patent is extended or adjusted under 35 U.S.C. 154(b) by 261 days.

(21) Appl. No.: 14/132,518

(22) Filed: Dec. 18, 2013

(65) Prior Publication Data
US 2014/0177307 A1   Jun. 26, 2014

(30) Foreign Application Priority Data
Dec. 20, 2012  (CN) .......................... 2012 1 0558982

(51) Int. Cl.
*H02M 7/23*   (2006.01)
*H02M 1/42*   (2007.01)
*H02M 1/12*   (2006.01)

(52) U.S. Cl.
CPC .............. *H02M 1/4225* (2013.01); *H02M 7/23* (2013.01); *H02M 2001/123* (2013.01); *Y02B 70/126* (2013.01)

(58) Field of Classification Search
CPC ... H02M 1/4208; H02M 7/217; H02M 7/219; H02M 7/23
USPC .......................................................... 363/89
See application file for complete search history.

(56) References Cited

U.S. PATENT DOCUMENTS

| | | | |
|---|---|---|---|
| 4,412,277 A | 10/1983 | Mitchell | |
| 6,320,772 B1 * | 11/2001 | Doyama | H02M 1/4208 363/127 |
| 6,411,535 B1 | 6/2002 | Roux | |
| 6,570,366 B1 * | 5/2003 | Lin | H02M 1/4208 323/207 |
| 6,738,274 B2 | 5/2004 | Prasad et al. | |
| 7,215,560 B2 * | 5/2007 | Soldano | H02M 1/4225 363/44 |
| 7,355,868 B2 * | 4/2008 | Soldano | H02M 1/4233 363/89 |
| 8,199,541 B2 * | 6/2012 | Yang | H02M 1/4208 323/207 |
| 2005/0105311 A1 * | 5/2005 | Soldano | H02M 1/4225 363/89 |
| 2005/0237010 A1 * | 10/2005 | Ying | H05B 41/245 315/312 |
| 2006/0198172 A1 * | 9/2006 | Wood | H02M 1/4233 363/89 |

(Continued)

OTHER PUBLICATIONS

Salmon, John C. Dr., "Circuit Topologies for PWM Boost Rectifiers Operated From 1-Phase and 3-Phase AC Supplies and Using Either Single or Split DC Rail Voltage Outputs", Department of Electrical Engineering, University of Alberta, IEEE, 1995, pp. 473-479.

(Continued)

*Primary Examiner* — Jeffrey Sterrett
(74) *Attorney, Agent, or Firm* — Harness, Dickey & Pierce, P.L.C.

(57) ABSTRACT

A power factor improvement circuit is configured with two series circuits each having a switching element and a rectifying element connected in series. Two input terminals of a single-phase AC power source are respectively connected between the switching elements and the rectifying elements in the series circuits. An inductor element is connected between an output terminal of the power factor improvement circuit and two terminals, which are on the other side of the rectifying elements, of the switching elements. A capacitor element is connected between the output terminal and the two terminals. According to the above configuration, it is possible to decrease a loss of a bridge circuit and common-mode noise, and to provide a power factor improvement circuit in a smaller size.

13 Claims, 11 Drawing Sheets

(56) References Cited

U.S. PATENT DOCUMENTS

| | | | |
|---|---|---|---|
| 2007/0058402 A1* | 3/2007 | Shekhawat | H02M 1/42 363/89 |
| 2007/0279955 A1 | 12/2007 | Liu et al. | |
| 2009/0168476 A1* | 7/2009 | Moon | H02M 1/4225 363/89 |
| 2012/0069615 A1* | 3/2012 | Tomioka | H02M 1/4208 363/126 |
| 2012/0243275 A1* | 9/2012 | Lin | H02M 1/4208 363/89 |
| 2013/0077365 A1* | 3/2013 | Chalermboon | H02M 1/4208 363/89 |
| 2014/0177307 A1* | 6/2014 | Wang | H02M 1/4225 363/127 |
| 2014/0328097 A1* | 11/2014 | Gumaer | H02M 1/4225 363/89 |
| 2015/0162822 A1* | 6/2015 | Ho | H02M 1/4208 363/89 |
| 2015/0280547 A1* | 10/2015 | Pu | H02M 1/4225 363/89 |

OTHER PUBLICATIONS de Souze, Alexandre Ferrari et al., "High Power Factor Rectifier With Reduced Conduction and Commutation Losses", Federal University of Santa Catarina, Power Electronic Institute, Brazel, IEEE, 1999, pp. 8-1.

* cited by examiner

POWER FACTOR IMPROVEMENT CIRCUIT

CROSS-REFERENCE TO RELATED APPLICATION

This application claims priority to Chinese Patent Application No. 201210558982.7 filed Dec. 20, 2012 which is hereby expressly incorporated by reference herein in its entirety.

BACKGROUND

The present invention relates to a power factor improvement circuit.

As shown in FIG. 1, in a conventional power factor improvement circuit 100 that corresponds to a boosting (step-up) type power factor improvement circuit, a bridge circuit 101 converts an AC (alternating current) input voltage into a DC (direct current) voltage. In the conventional power factor improvement circuit explained above, efficiency has been improved by technologies relating to software switching and synchronous rectification. However, in a present power factor improvement circuit that performs with high efficiency, a loss in the bridge circuit has been accounting for a large percentage among losses of main components. Accordingly, various circuit configurations have been proposed in order to reduce or eliminate the loss in the bridge circuit.

In a conventional power factor improvement circuit 200 shown in FIG. 2, during a positive period of an input alternating current, the alternating current flows through a diode (rectifying element) 201 so that a switching element 203 performs a switching operation. Further, during a negative period of the input alternating current, the alternating current flows through a diode 202 so that a switching element 204 performs a switching operation. In the circuit configuration explained above, because the number of diodes that are included in the current flow route is small, efficiency of a circuit is relatively high. However, this circuit configuration still has a problem in which common-mode noise is large.

In a conventional power factor improvement circuit 300 shown in FIG. 3, during a positive period of the input alternating current, the alternating current flows through a parasitic diode of a switching element 301 so that a switching element 302 performs a switching operation. Further, during a negative period of the input alternating current, the alternating current flows through a parasitic diode of the switching element 302 so that the switching element 301 performs a switching operation. However, because of a recovery problem of the parasitic diodes of the switching elements 301 and 302, the switching operation is limited to a discontinuous current mode.

In a conventional power factor improvement circuit 400 shown in FIG. 4, during a positive period of the input alternating current, a switching element 401 performs a switching operation. Further, during a negative period of the input alternating current, a switching element 402 performs a switching operation. In the circuit configuration explained above, diodes 403, 404 and inductor elements 405, 406 can solve the common-mode noise problem. However, because two inductor elements 405, 406 are needed, the size of the circuit becomes large.

In the same way as FIG. 4, in a conventional power factor improvement circuit 500 shown in FIG. 5, during a positive period of the input alternating current, a switching element 501 performs a switching operation. Further, during a negative period of the input alternating current, a switching element 502 performs a switching operation. In the circuit configuration explained above, diodes 503, 504 and a transformer 505 can solve the common-mode noise problem. However, because the transformer 505 (a mutual inductor) is needed, the size of the circuit becomes large.

In a conventional power factor improvement circuit 600 shown in FIG. 6A, during a positive period of the input alternating current, a switching element 601 performs a switching operation. Further, during a negative period of the input alternating current, a switching element 602 performs a switching operation. As a result, a loss in a bridge circuit can be reduced. Here, a driving ground node 603 is connected to a ground potential for a driving circuit of the switching elements 601, 602. When a terminal L is positive, the driving ground node 603 is stable without swinging with respect to a terminal N that is in a stable voltage state. In contrast, when the terminal N is positive, the driving ground node 603 is connected to an inductor through a parasitic diode of the switching element 601. In this case, because the switching element 602 performs the switching operation, a voltage potential of the driving ground node 603 swings (hopping) with a switching frequency (a high frequency) at a half of a cycle with respect to the terminal N as shown in FIG. 6B. Therefore, the common-mode noise can easily occur. In addition, because the driving ground node 603 is not stable, the common-mode noise due to swinging of the driving ground node 603 is converted to a system common-mode noise by a power supply system (the driving circuit). Thus, an anti-coherence (an anti-noise) property of the driving circuit is highly required.

SUMMARY

The present invention attempts to solve the problems explained above. An object of the present invention is to provide a power factor improvement circuit that can reduce a loss in a bridge circuit and decrease the common-mode noise.

To achieve the above object, a power factor improvement circuit according to one aspect of the present invention includes: a first series circuit in which a first switching element and a first rectifying element are serially connected; a second series circuit in which a second switching element and a second rectifying element are serially connected; a single-phase alternating current (AC) power source that has first and second input terminals, the first input terminal being connected to a first node between the first switching element and the first rectifying element, the second input terminal being connected to a second node between the second switching element and the second rectifying element; an inductor element that is connected between a terminal, which is on the other side of the first node, of the first switching element and a terminal, which is on the other side of the second node, of the second switching element; a third rectifying element that is connected between the terminal of the first switching element and an output terminal; a fourth rectifying element that is connected between the terminal of the second switching element and the output terminal; and a capacitor element that is connected between a terminal, which is on the other side of the first node, of the first rectifying element and the output terminal, the capacitor that is also connected between a terminal, which is on the other side of the second node, of the second rectifying element and the output terminal.

In the power factor improvement circuit according to the aspect of the present invention, not only a diode loss can decrease, but also the common-mode noise can decrease. In addition, because there is one inductor element in the circuit, the size of the circuit can be small.

A power factor improvement circuit according to another aspect of the present invention includes that at least two of the above power factor improvement circuits are connected in parallel. Therefore, in the power factor improvement circuit according to the aspect of the present invention, it is possible to provide a power factor improvement circuit that can output a large electric current and high power.

Further, in the power factor improvement circuit according to the aspect of the present invention, each of the at least two of the above power factor improvement circuits may commonly use the rectifying elements that are respectively connected to the switching elements in series. Thus, it is possible to provide a power factor improvement circuit that can output a large current and high power in a smaller size.

A power factor improvement circuit according to another aspect of the present invention includes that "n" of the above power factor improvement circuits are connected in parallel. Here "n" is an integer of 2 or more. A phase of an operation frequency of each of the "n" power factor improvement circuits may be shifted by 360/n degrees. Therefore, in the power factor improvement circuit according to the aspect of the present invention, it is possible to provide a power factor improvement circuit that can output an even larger current and higher power. At the same time, input and output ripple currents can decrease. Further, electromagnetic interference (EMI) noise can decrease. As a result, the service life of an output electrolytic capacitor can be improved.

Further, in the power factor improvement circuit according to the aspect of the present invention, a switching element may not need to include a diode therein. This configuration can widen a selection range of the device.

Alternatively, in the power factor improvement circuit according to the aspect of the present invention, a switching element may include a diode therein. This configuration can control the switching element more easily.

Further, in the power factor improvement circuit according to the aspect of the present invention, when a first voltage of the first input terminal of the single-phase AC power source is higher than a second voltage of the second input terminal of the single-phase AC power source, the first switching element is in a conductive state and the second switching element performs a switching operation by alternating conductive and non-conductive states thereof by an operating frequency. As a result, each of the switching elements can adequately control the power factor improvement circuit.

Further, in the power factor improvement circuit according to the aspect of the present invention, when a first voltage of the first input terminal of the single-phase AC power source is higher than a second voltage of the second input terminal of the single-phase AC power source, the first switching element is in a non-conductive state and the second switching element performs a switching operation by alternating conductive and non-conductive states thereof by an operating frequency. As a result, even when each of the switching elements has a diode that is connected thereto in parallel (a parasitic diode or an external diode), the power factor improvement circuit can be adequately controlled.

Further, in the power factor improvement circuit according to the aspect of the present invention, the first and second switching elements perform a switching operation by alternating conductive and non-conductive states thereof by an operating frequency. As a result, even when each of the switching elements has a diode that is connected thereto in parallel (a parasitic diode or an external diode), the power factor improvement circuit can be adequately controlled.

In the power factor improvement circuit according to another aspect of the present invention, first and second reverse recovery times of the first and second rectifying elements, respectively, are longer than third and fourth reverse recovery times of the third and fourth rectifying elements. Further, first and second switching characteristics of the first and second rectifying elements, respectively, correspond to a frequency of the single-phase AC power source. As a result, the common-mode noise can be improved. Thus, a relative stability of a ground potential for a driving circuit can be realized.

A power factor improvement circuit according to another aspect of the present invention includes first and second control switching elements that are respectively connected to the first and second rectifying elements in parallel. The first and second control switching elements are controlled in synchronization with a frequency of the single-phase AC power source. As a result, the common-mode noise can be improved. Thus, a relative stability of a ground potential for a driving circuit can be realized.

A power factor improvement circuit according to another aspect of the present invention includes at least one of a second capacitor that is connected between the first input terminal and the output terminal, a third capacitor that is connected between the second input terminal and the output terminal, a fourth capacitor that is connected between both ends of the first rectifying element in parallel, and a fifth capacitor that is connected between both ends of the second rectifying element in parallel. As a result, because a voltage variation of the AC power source and the first and second rectifying elements can decrease, the common-mode noise can be improved. Thus, a relative stability of a ground potential for a driving circuit can be realized.

The power factor improvement circuit according to the aspect of the present invention can reduce a loss in a bridge circuit and the common-mode noise. Therefore, a power factor improvement circuit in a smaller size can be provided. At the same time, the power factor improvement circuit is easily controlled and outputs large electric current and high power.

DESCRIPTION OF EXEMPLARY EMBODIMENTS

As discussed below, a power factor improvement circuit according to an embodiment of the present invention is explained with reference to the drawings.

First Embodiment

Figure 7:
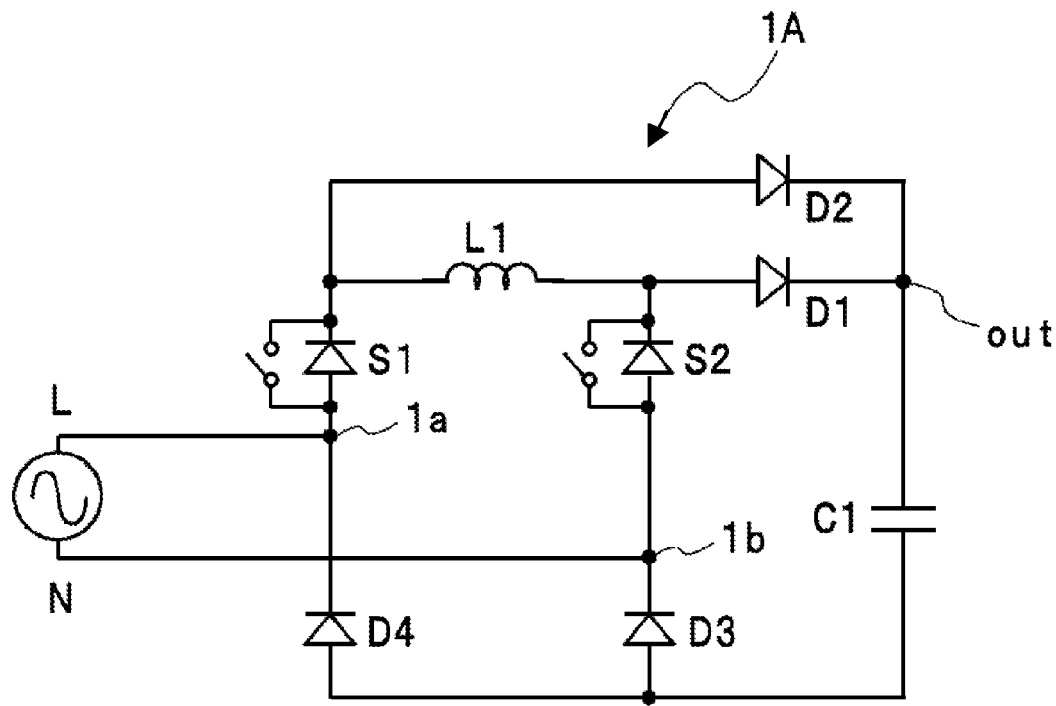
FIG. 7 is a circuit diagram of a power factor improvement circuit 1A according to a first embodiment of the present invention.

As shown in FIG. 7, a power factor improvement circuit 1A according to a first embodiment of the present invention is configured with two series circuits, input terminals 1a and 1b of a single-phase AC power source, an inductor element L1, two diodes D1 and D2, and a capacitor element C1. Specifically, a switching element S1 and a diode D4 are connected in series as one of the two series circuits. A switching element S2 and a diode D3 are connected in series as the other of the two series circuits. The input terminals 1a and 1b of the single-phase AC power source are connected to nodes between the switching elements S1 and S2 and the diodes D4 and D3, respectively, in the two series circuits. Further, the inductor element L1 is connected between other terminals, which are opposite to the nodes, of the two switching elements S1 and S2. The two diodes D2 and D1 are respectively connected between the other terminals of the switching elements S1 and S2 and an output terminal "out." The capacitor element C1 is connected between other terminals, which are opposite to the nodes, of the diodes D3 and D4 in the two series circuits and the output terminal "out." As shown in FIG. 7, the input terminal 1a of the single-phase AC power source is defined as terminal "L" and the input terminal 1b of the single-phase AC power source is defined as terminal "N."

In the first embodiment of the present invention, the switching elements S1 and S2 have parasitic diodes that are connected in parallel. For instance, an FET (field effect transistor), especially a MOSFET (metal oxide semiconductor field effect transistor) can be used as each of the switching elements S1 and S2. Further, the switching elements S1 and S2 have external diodes that are connected to both terminals of the switching elements S1 and S2 in parallel. As a result, the same effects as the parasitic diodes can be obtained.

Further, it is preferred that the diodes D3 and D4 in the series circuits have a slow reverse recovery characteristic. Thus, their reverse recovery time is longer than a reverse recovery time of the diodes D1 and D2 that are connected to the output terminal "out." The reasons for the above features are explained below. In FIG. 7, the input terminals 1a and 1b are ground potentials for a driving circuit of the switching elements S1 and S2. The diodes D3 and D4 respectively connect the input terminals 1b and 1a to (a negative terminal of) the capacitor C1. Because the input terminals 1a and 1b are terminals L and N of the single-phase AC power source, the input terminals 1a and 1b are stable nodes. Because the diodes D3 and D4 have the slow reverse recovery characteristic, the negative terminal (connected to a ground potential) of the capacitor C1 is stable. As a result, because the grounded input terminals 1a and 1b for a driving circuit and the grounded negative terminal of the capacitor C1 are stable, the common-mode noise is improved (reduced). In addition, it is preferred that a switching characteristic, which is shown by the diodes D3 and D4 in the series circuits, corresponds to a frequency of the single-phase AC power source. In other words, the recovery times of the diodes D3 and D4 are the same as a half cycle with respect to the frequency of the single-phase AC power source. As a result, the common-mode noise can be improved. Thus, a relative stability of a ground potential for a driving circuit can be realized.

An operating principle of the power factor improvement circuit 1A will be explained below.

Figure 8:
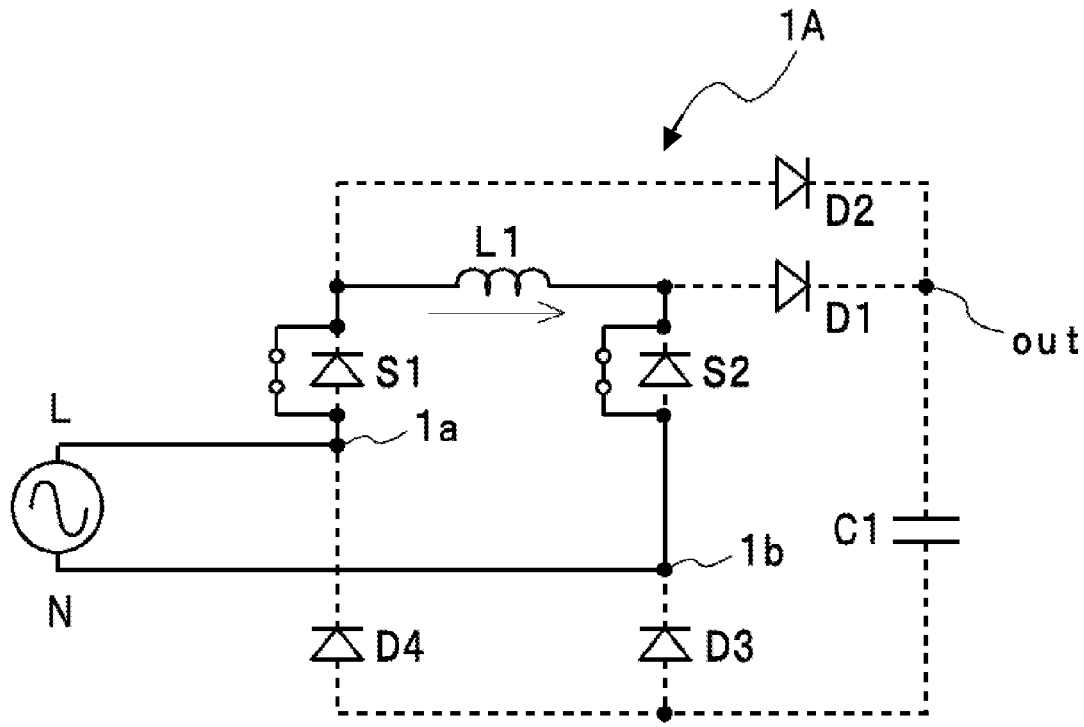
FIG. 8 shows a current route in an operation state 1 of the power factor improvement circuit 1A according to the first embodiment of the present invention.
Figure 9:
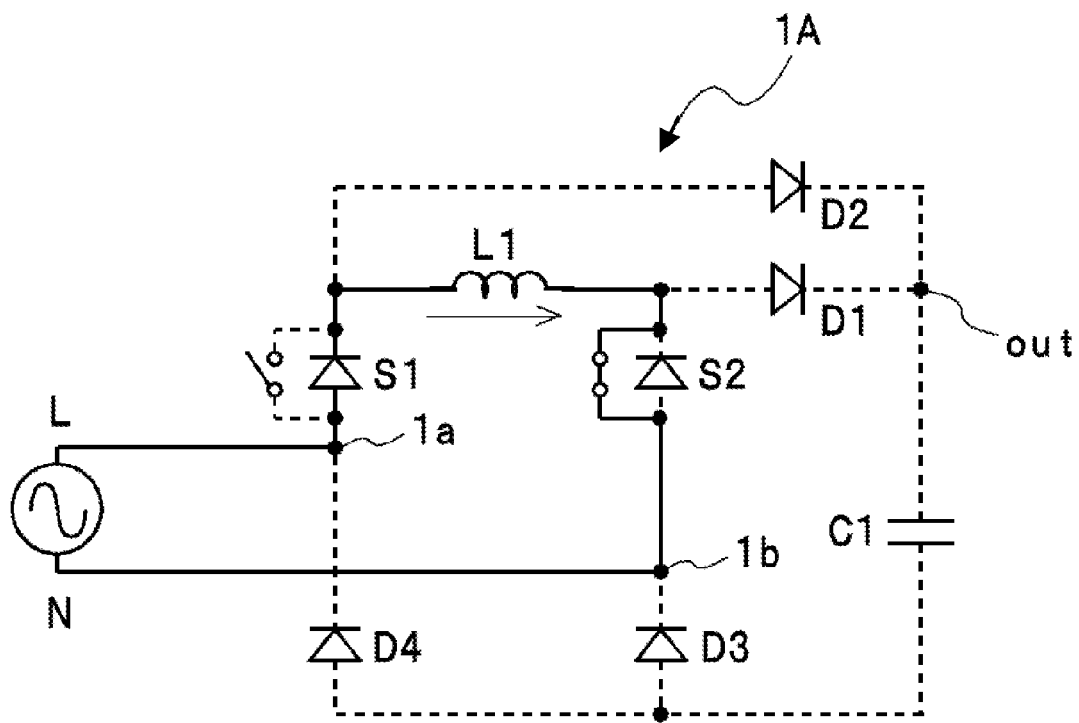
FIG. 9 shows a current route in the operation state 1 of the power factor improvement circuit 1A according to the first embodiment of the present invention.

State 1 (FIGS. 8 and 9): When a voltage of the terminal L is higher than a voltage of the terminal N, the switching element S2 is in a conductive state. As a result, the switching element S1 becomes in one of conductive, non-conductive and switching states (i.e. three states corresponding to a switching operation). When the switching element S1 is in the conductive state, the electric current flows through the switching element S1, the inductor element L1 and the switching element S2 as shown in FIG. 8. When the switching element S1 is in the non-conductive state, the electric current flows through a diode, which is connected to the switching element S1 in parallel, the inductor element L1 and the switching element S2 as shown in FIG. 9. In this case, energy of the AC power source is accumulated into the inductor element L1.

Figure 10:
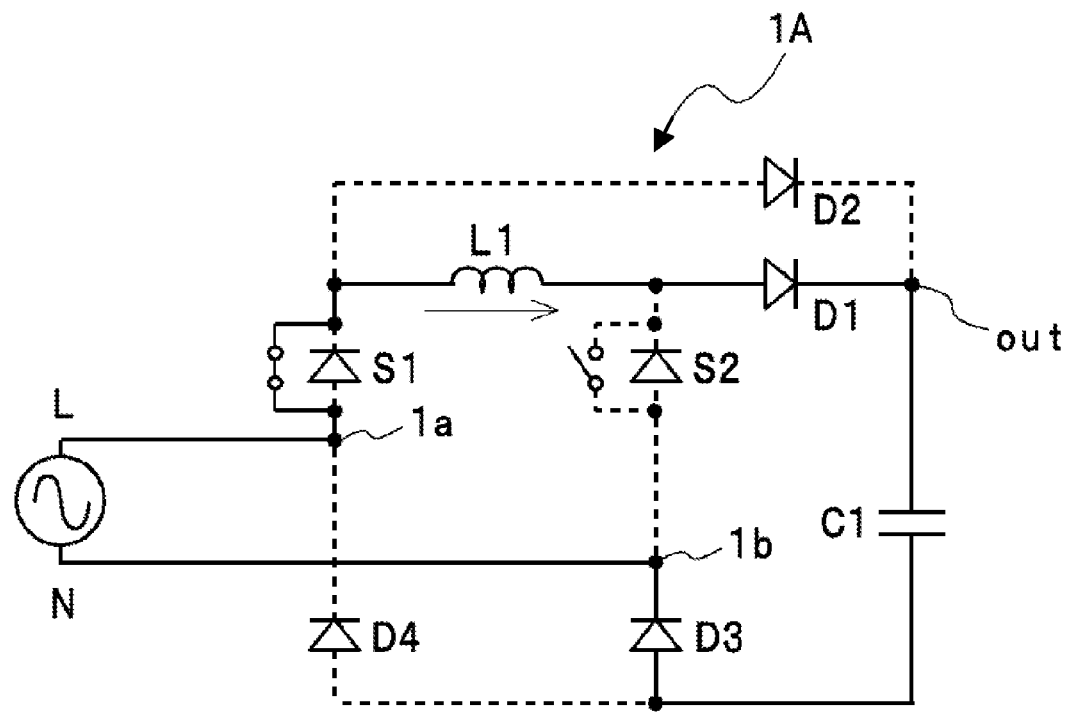
FIG. 10 shows a current route in an operation state 2 of the power factor improvement circuit 1A according to the first embodiment of the present invention.
Figure 11:
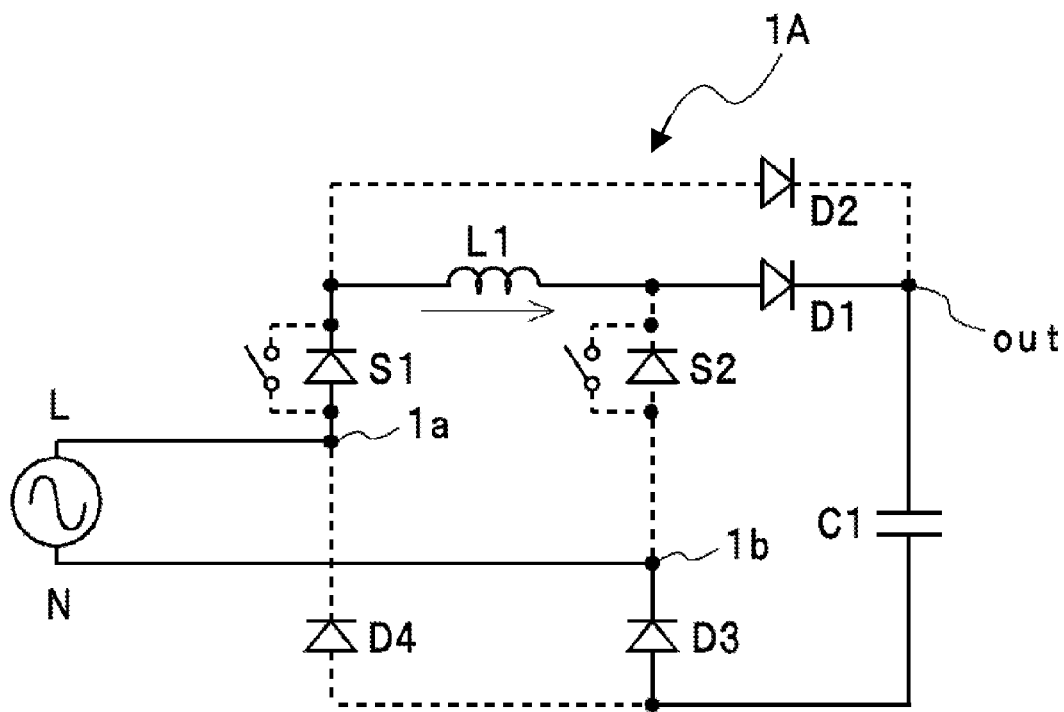
FIG. 11 shows a current route in the operation state 2 of the power factor improvement circuit 1A according to the first embodiment of the present invention.

State 2 (FIGS. 10 and 11): When the voltage of the terminal L is higher than the voltage of the terminal N, the switching element S2 is in a non-conductive state. As a result, the switching element S1 becomes in one of conductive, non-conductive and switching states. When the switching element S1 is in the conductive state, the electric current flows through the switching element S1, the inductor element L1, the diode D1, the capacitor element C1 and the diode D3 as shown in FIG. 10. When the switching element S1 is in the non-conductive state, the electric current flows through a diode, which is connected to the switching element S1 in parallel, the inductor element L1, the diode D1, the capacitor element C1 and the diode D3 as shown in FIG. 11. In this case, energy of the AC power source and the inductor element L1 is transferred to the capacitor element C1.

Figure 12:
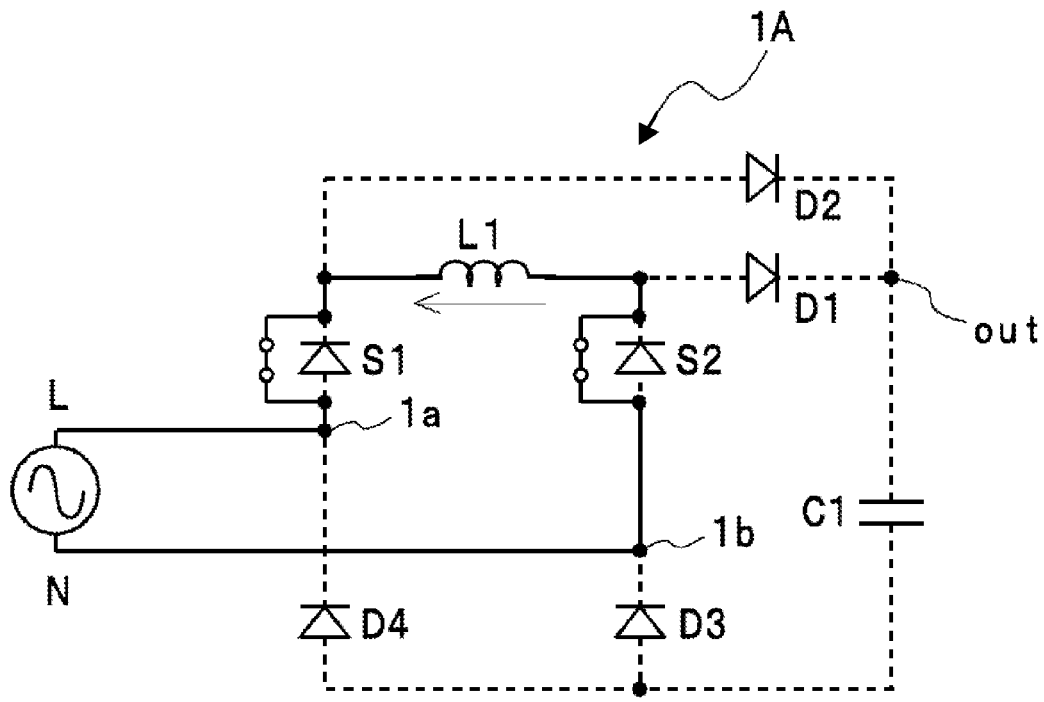
FIG. 12 shows a current route in an operation state 3 of the power factor improvement circuit 1A according to the first embodiment of the present invention.
Figure 13:
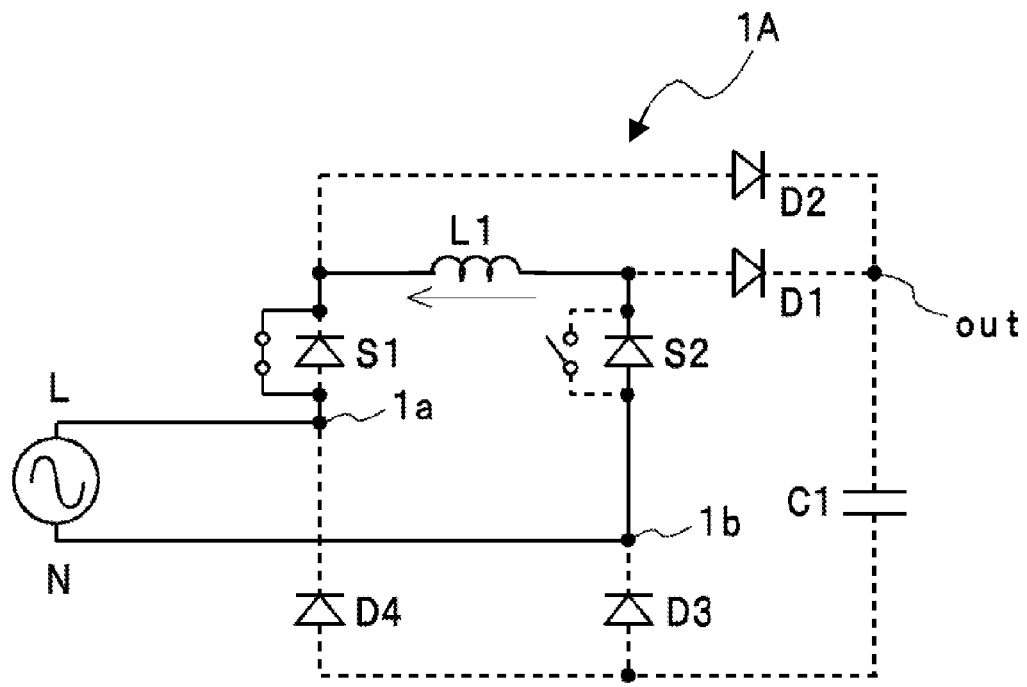
FIG. 13 shows a current route in the operation state 3 of the power factor improvement circuit 1A according to the first embodiment of the present invention.

State 3 (FIGS. 12 and 13): When the voltage of the terminal L is lower than the voltage of the terminal N, the switching element S1 is in the conductive state. As a result, the switching element S2 becomes in one of conductive, non-conductive and switching states. When the switching element S2 is in the conductive state, the electric current flows through the switching element S2, the inductor element L1 and the switching element S1 as shown in FIG. 12. When the switching element S2 is in the non-conductive state, the electric current flows through the diode, which is connected to the switching element S2 in parallel, the inductor element L1 and the switching element S1 as shown in FIG. 13. In this case, energy of the AC power source is accumulated into the inductor element L1.

Figure 14:
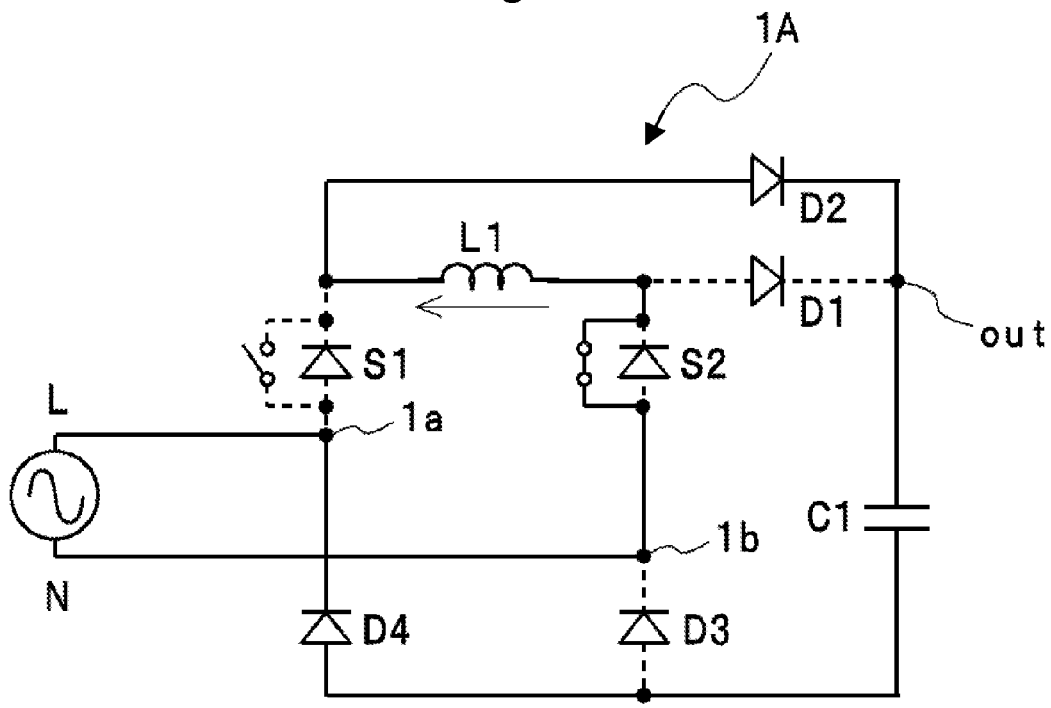
FIG. 14 shows a current route in an operation state 4 of the power factor improvement circuit 1A according to the first embodiment of the present invention.
Figure 15:
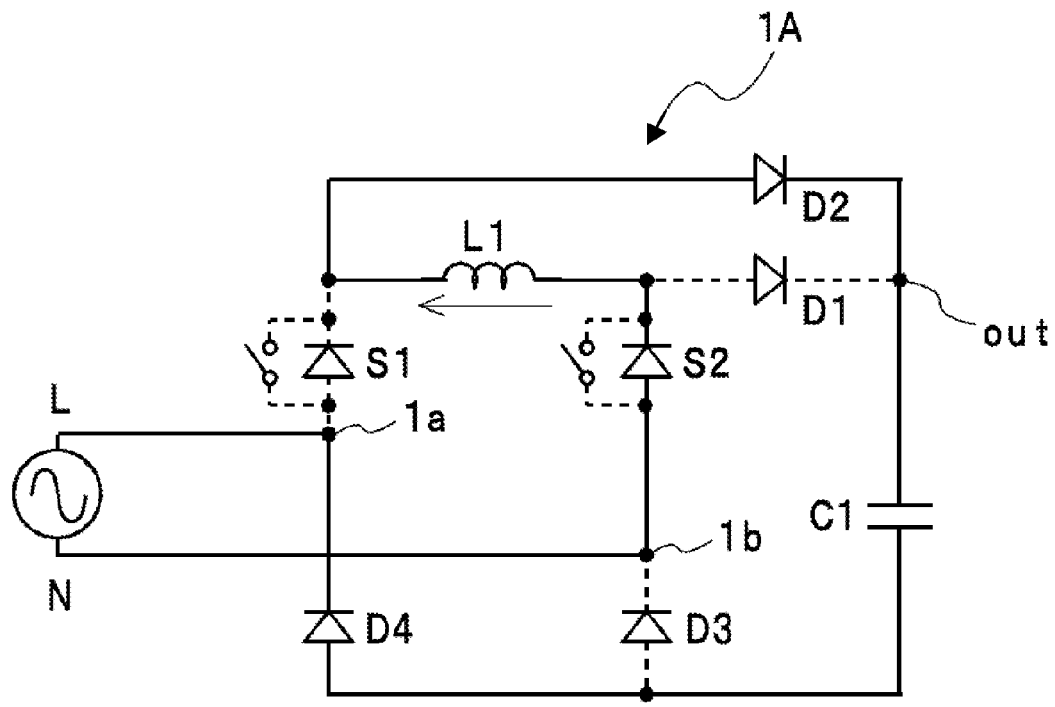
FIG. 15 shows a current route in the operation state 4 of the power factor improvement circuit 1A according to the first embodiment of the present invention.

State 4 (FIGS. 14 and 15): When the voltage of the terminal L is lower than the voltage of the terminal N, the switching element S1 is in the non-conductive state. As a result, the switching element S2 becomes in one of conductive, non-conductive and switching states. When the switching element S2 is in the conductive state, the electric current flows through the switching element S2, the inductor element L1, the diode D2, the capacitor element C1 and the diode D4 as shown in FIG. 14. When the switching element S2 is in the non-conductive state, the electric current flows through the diode, which is connected to the switching element S2 in parallel, the inductor element L1, the diode D2, the capacitor element C1 and the diode D4 as shown in FIG. 15. In this case, energy of the AC power source and the inductor element L1 is transferred to the capacitor element C1.

A conductive state and a non-connective state of each of the switching elements explained above are controlled by a controller chip. An operating frequency of the switching element is extremely higher than a typical frequency of an AC power source that is, for instance, 20 kHz. When the voltage of the terminal L is higher than the voltage of the terminal N, the controller chip controls the switching element S2 to be switched by the operating frequency. In this case, the switching element S1 can be in any of the states. Further, when the voltage of the terminal L is lower than the voltage of the terminal N, the controller chip controls the switching element S1 to be switched by the operating frequency. In this case, the switching element S2 can be in any of the states. Alternatively, the switching elements S1 and S2 can be switched in synchronization with the operating frequency. As discussed above, the conductive state and the non-connective state of each of the switching elements can easily be controlled by the controller chip.

Figure 1:
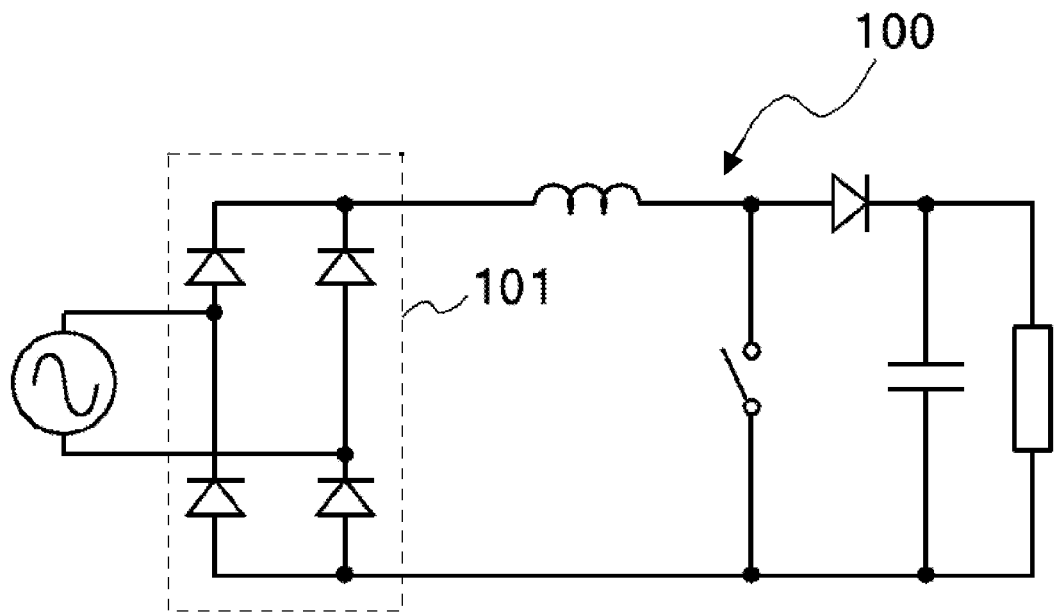
FIG. 1 is a circuit diagram of one example of a conventional power factor improvement circuit 100.

Under the operation of the power factor improvement circuit 1A explained above, the electric current flows through two diodes and one switching element at most. As compared with the prior art shown in FIG. 1, with respect to the number of elements through which the electric current flows, the power factor improvement circuit 1A has two less diodes and one more switching element during the conductive state. Similarly, the power factor improvement circuit 1A has one less diode and one more switching element during the non-connective state. Because a resistance value of the switching elements is adequately small, the efficiency of the power factor improvement circuit 1A becomes higher than the efficiency in the conventional circuit shown in FIG. 1.

Figure 3:
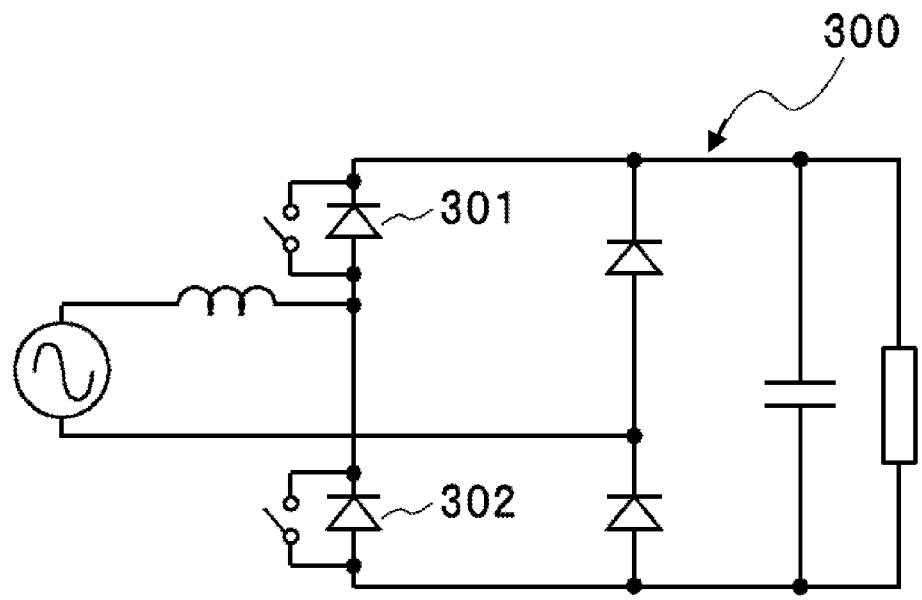
FIG. 3 is a circuit diagram of another example of a conventional power factor improvement circuit 300.
Figure 4:
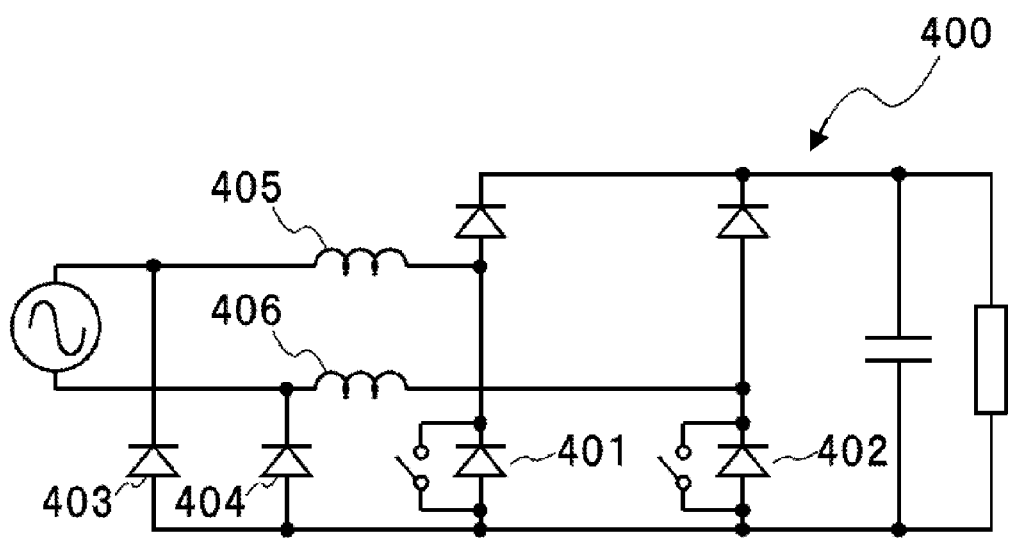
FIG. 4 is a circuit diagram of another example of a conventional power factor improvement circuit 400.
Figure 5:
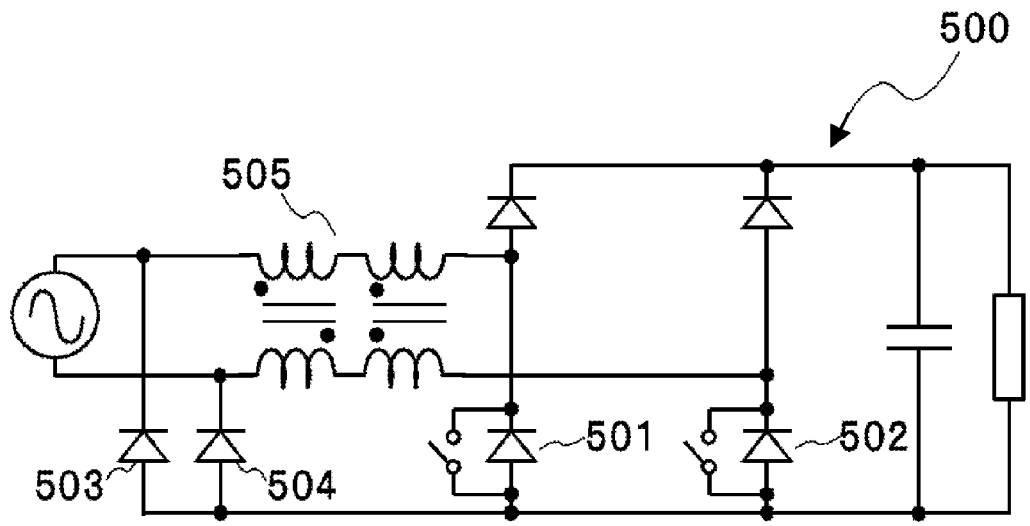
FIG. 5 is a circuit diagram of another example of a conventional power factor improvement circuit 500.

Further, the number of the elements through which the electric current flows during the conductive state and the non-connective state was compared between the power factor improvement circuit 1A and the power factor improvement circuits 300-500 shown in FIGS. 3-5. The result of the comparison is shown in Table 1 below. Because a conductive resistance value of the switching elements is adequately small, a conductive state voltage drop of the switching elements can be ignored. As compared with the power factor improvement circuits 400 and 500 as shown in FIGS. 4 and 5, when the power factor improvement circuits 1A, 400 and 500 are in both conductive and non-conductive states, the power factor improvement circuit 1A has one less diode through which the electric current flows. Specifically, the total number of the diodes through which the electric current flows during both conductive and non-conductive states for the power factor improvement circuit 1A is 2 (0+2=2). In contrast, the total number of the diodes through which the electric current flows during both conductive and non-conductive states for the power factor improvement circuits 400 and 500 is 3 (1+2=3). Further, the number of the diodes (0+2=2) through which the electric current flows during both conductive and non-conductive states for the power factor improvement circuit 1A is the same as the number of the diodes (1+1=2) through which the electric current flows during both conductive and non-conductive states for the power factor improvement circuit 300 as shown in FIG. 3. However, because the power factor improvement circuit 300 is limited to the recovery of the diode, the operation mode is limited. In addition, the recovery of the diode causes a deterioration of circuit efficiency. Therefore, the efficiency of the power factor improvement circuit 1A explained above is higher than the efficiency of the power factor improvement circuits 300-500 shown in FIGS. 3-5.

TABLE 1

| Power Factor Improvement Circuit | Conductive State | | Non-conductive State | |
|---|---|---|---|---|
| | Switch | Diode | Switch | Diode |
| 1A | 2 | 0 | 1 | 2 |
| 300 (FIG. 3) | 1 | 1 | 1 | 1 |
| 400 (FIG. 4) | 1 | 1 | 0 | 2 |
| 500 (FIG. 5) | 1 | 1 | 0 | 2 |

Figure 2:
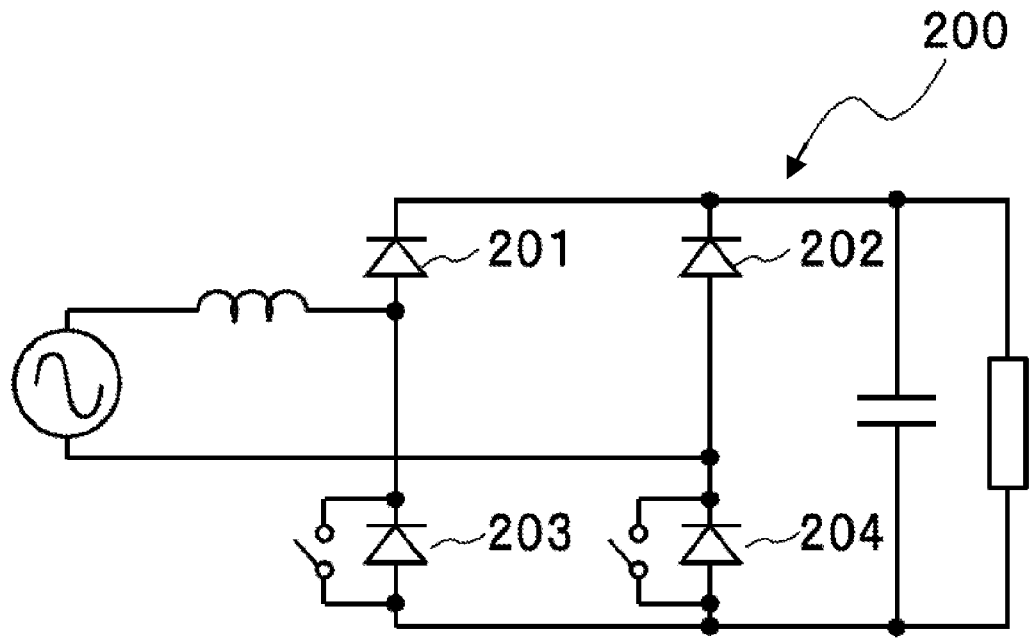
FIG. 2 is a circuit diagram of another example of a conventional power factor improvement circuit 200.
Figure 6A:
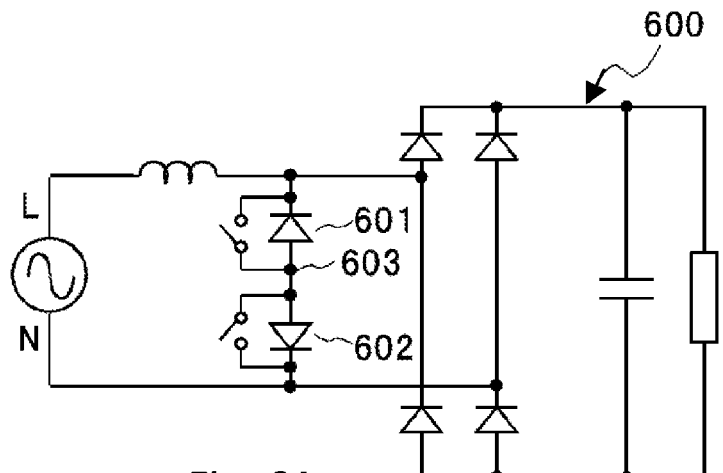
FIG. 6A is a circuit diagram of another example of a conventional power factor improvement circuit 600.
Figure 6B:
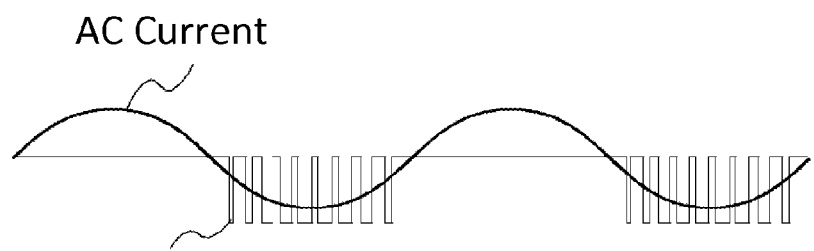
FIG. 6B is a waveform diagram of an alternating current and a driving ground in the conventional power factor improvement circuit 600 as shown in FIG. 6A.

Further, the efficiency of the power factor improvement circuit 1A according to the embodiment of the present invention is not higher as compared with the power factor improvement circuit 200 shown in FIG. 2. However, because a voltage potential between an AC input terminal and a ground potential does not swing (hopping), a noticeable problem of the common-mode noise that exists in the power factor improvement circuit 200 shown in FIG. 2 can be solved in the power factor improvement circuit 1A. Further, the ground potential of a driving circuit in the power factor improvement circuit 1A according to the embodiment of the present invention is relatively stable compared with the ground potential of the power factor improvement circuit 600 as shown in FIG. 6A. As a result, the common-mode noise by the swinging (hopping) of the driving ground potential is not generated. Therefore, the common-mode noise of an entire system can be decreased.

Further, the power factor improvement circuit 1A according to the embodiment of the present invention has only one inductor element. Therefore, as compared with the power factor improvement circuits 400, 500 shown in FIGS. 4 and 5, the size of the power factor improvement circuit 1A can be reduced.

Further, the power factor improvement circuit 1A according to the embodiment of the present invention can be operated in both continuous and discontinuous modes. As a result, an application range of the power factor improvement circuit 1A is wider than the power factor improvement circuit 300 shown in FIG. 3.

Second Embodiment

Figure 16:
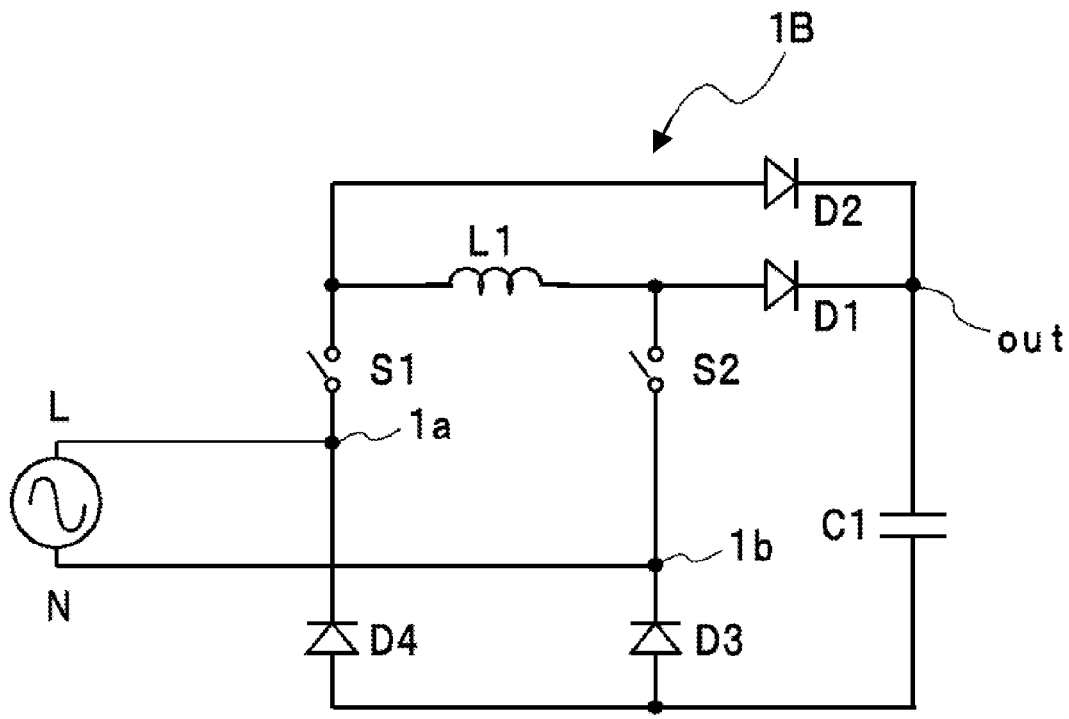
FIG. 16 is a circuit diagram of a power factor improvement circuit 1B according to a second embodiment of the present invention.

FIG. 16 shows a power factor improvement circuit 1B according to a second embodiment of the present invention. In the power factor improvement circuit 1B according to the second embodiment of the present invention, switching elements S1 and S2 do not have diodes that are connected thereto in parallel. It is in this respect that the power factor improvement circuit 1B is mainly different from the power factor improvement circuit 1A according to the first embodiment of the present invention.

The power factor improvement circuit 1B according to the second embodiment of the present invention is configured with two series circuits, input terminals 1a and 1b of a single-phase AC power source, an inductor element L1, two diodes D1 and D2, and a capacitor element C1. Specifically, the switching element S1 and a diode D4 are connected in series as one of the two series circuits. The switching element S2 and a diode D3 are connected in series as the other of the two series circuits. The input terminals 1a and 1b of the single-phase AC power source are connected to nodes between the switching elements S1 and S2 and the diodes D4 and D3, respectively, in the two series circuits. Further, the inductor element L1 is connected between other terminals, which are opposite to the nodes, of the two switching elements S1 and S2. The two diodes D2 and D1 are respectively connected between the other terminals of the switching elements S1 and S2 and an output terminal "out." The capacitor element C1 is connected between other terminals, which are opposite to the nodes, of the diodes D3 and D4 in the two series circuits and the output terminal "out." As shown in FIG. 16, the input terminal 1a of the single-phase AC power source is defined as terminal "L" and that the input terminal 1b of the single-phase AC power source is defined as terminal "N."

In the second embodiment of the present invention, each of the switching elements S1 and S2 does not have a parallel diode. For instance, a BJT (bipolar junction transistor) or an IGBT (insulated gate bipolar transistor) can be used as the switching elements S1 and S2. An operating principle of the power factor improvement circuit 1B will be explained below.

State 1: When a voltage of the terminal L is higher than a voltage of the terminal N, the switching element S1 is in a conductive state and the switching element S2 is also in the conductive state. The electric current flows through the switching element S1, the inductor element L1 and the switching element S2 as shown in FIG. 8. At this time, energy of the AC power source is accumulated into the inductor element L1.

State 2: When the voltage of the terminal L is higher than the voltage of the terminal N, the switching element S1 is in the conductive state and the switching element S2 is in a non-conductive state. The electric current flows through the switching element S1, the inductor element L1, the diode D1, the capacitor element C1 and the diode D3 as shown in FIG. 10. At this time, energy of the AC power source and the inductor element L1 is transferred to the capacitor element C1.

State 3: When the voltage of the terminal L is lower than the voltage of the terminal N, the switching element S1 is in the conductive state and the switching element S2 is also in the conductive state. The electric current flows through the switching element S2, the inductor element L1 and the switching element S1 as shown in FIG. 12. At this time, energy of the AC power source is accumulated into the inductor element L1.

State 4: When the voltage of the terminal L is lower than the voltage of the terminal N, the switching element S1 is in the non-conductive state and the switching element S2 is in the conductive state. The electric current flows through the switching element S2, the inductor element L1, the diode D2, the capacitor element C1 and the diode D4 as shown in FIG. 14. At this time, energy of the AC power source and the inductor element L1 is transferred to the capacitor element C1.

The conductive state and the non-connective state of each of the switching elements explained above are controlled by a controller chip. An operating frequency of the switching elements is extremely higher than a typical frequency of an AC power source that is, for instance, 20 kHz. When the voltage of the terminal L is higher than the voltage of the terminal N, the controller chip controls the switching element S1 to be in the conductive state and also controls the switching element S2 to be switched by the operating frequency. When the voltage of the terminal L is lower than the voltage of the terminal N, the controller chip controls the switching element S2 to be in the conductive state and also controls the switching element S1 to be switched by the operating frequency. This operation system can widen a selection range of the device used for a switching element.

In the same way as the power factor improvement circuit 1A of the first embodiment does, the power factor improvement circuit 1B according to the second embodiment of the present invention can reduce a loss in a bridge circuit, the common-mode noise and the size of a circuit.

Third Embodiment

Figure 17:
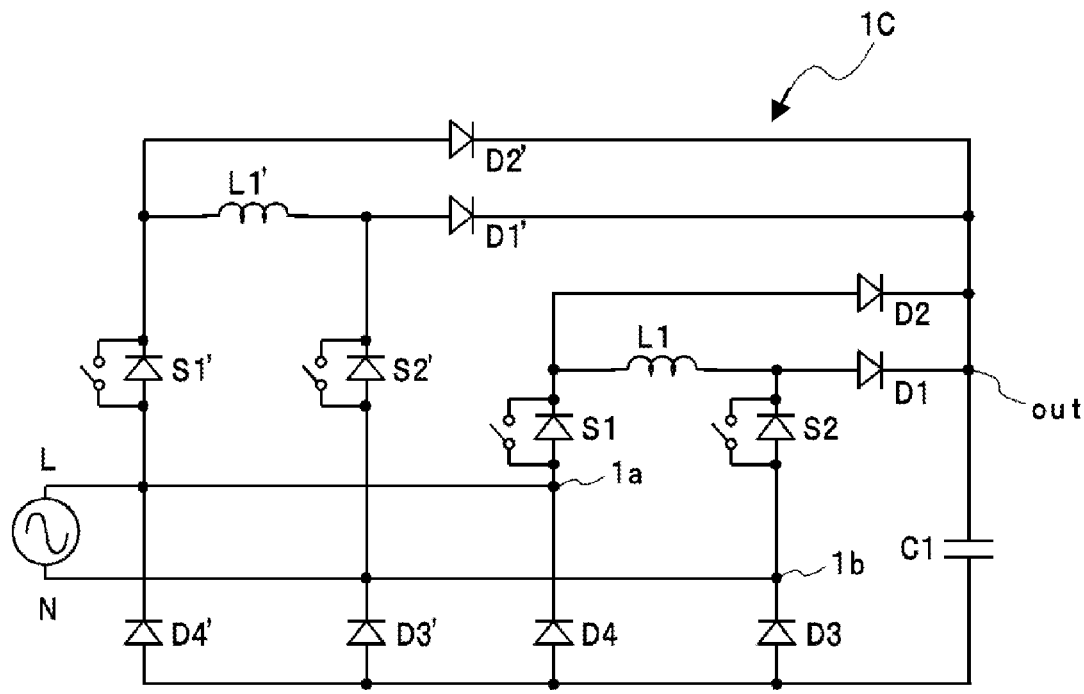
FIG. 17 is a circuit diagram of a power factor improvement circuit 1C according to a third embodiment of the present invention.

FIG. 17 shows a power factor improvement circuit 1C according to a third embodiment of the present invention. In the power factor improvement circuit 1C according to the third embodiment, at least two power factor improvement circuit modules are connected in parallel. The at least two power factor improvement circuit modules correspond to the power factor improvement circuit 1A according to the first embodiment of the present invention. In addition, at least two power factor improvement circuit modules corresponding to the power factor improvement circuit 1B according to the second embodiment can be connected in parallel to obtain the power factor improvement circuit 1C as well (not shown).

Figure 18:
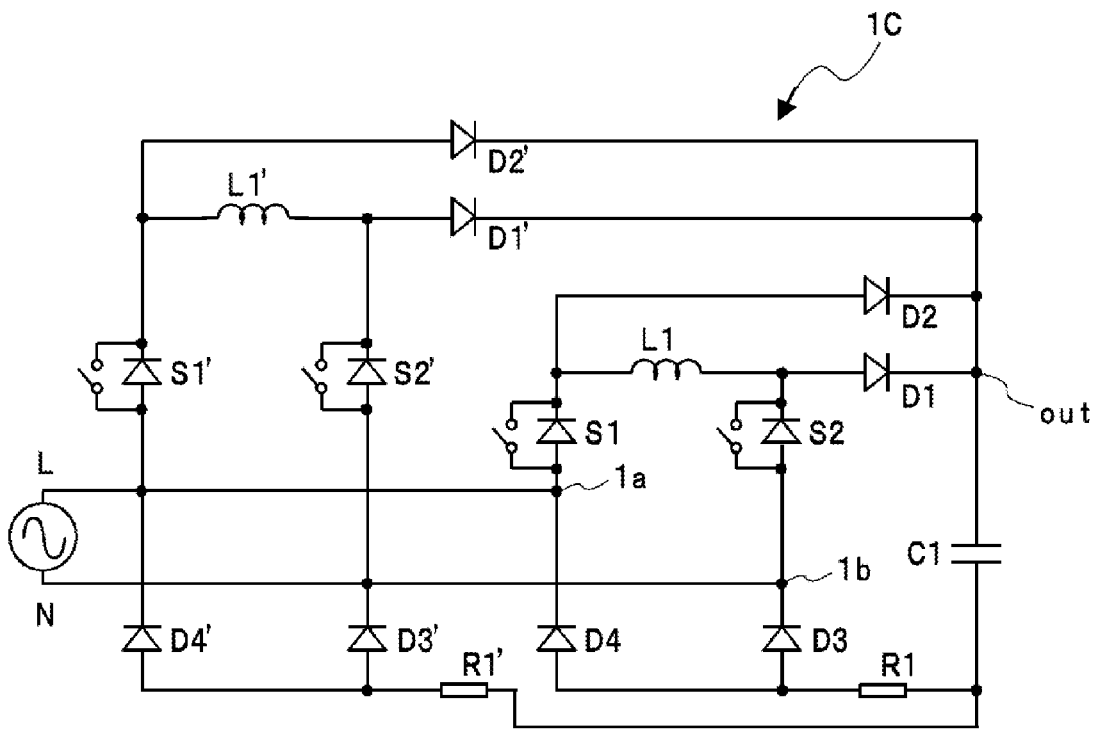
FIG. 18 is a circuit diagram in which a current sampling circuit is added to the power factor improvement circuit 1C according to the third embodiment of the present invention.

In the third embodiment of the present invention, an output electric current can be increased by connecting the two power factor improvement circuit modules in parallel. Further, a current sampling circuit can be added as shown in FIG. 18 so as to sample an electric current of each of the power factor improvement circuit modules. The current sampling circuit can also be a resistor, a current transformer or other devices for sampling. As an example, sampling resistors R1 and R1' are shown in FIG. 18. By measuring a voltage between both terminals of the sampling resistors R1 and R1', the electric current that flows in each module can be obtained.

In the third embodiment of the present invention, as an example, it is shown that two of the power factor improvement circuit modules are connected in parallel. However, three or more power factor improvement circuit modules can also be connected in parallel. In that case, an even larger output electric current can be obtained.

Further, with respect of each power factor improvement circuit module, it is preferred that a phase of an operating frequency of a switch is shifted among the plurality of power factor improvement circuit modules. For instance, when two power factor improvement circuit modules are connected in parallel, a phase is shifted by 180 degrees among them. When three power factor improvement circuit modules are connected in parallel, a phase is shifted by 120 degrees. Similarly, when four power factor improvement circuit modules are connected in parallel, a phase is shifted by 90 degrees. That is, the following formula is satisfied: (phase-shifted degree)× (the number of modules connected in parallel)=360 degrees.

Specifically, when "n," which corresponds to an integer of 2 or more, of the power factor improvement circuit modules are connected in parallel, a phase of each of the switching elements S2, S2,' ... is shifted by 360/n degrees in the above operation states 1 and 2. Similarly, a phase of each of the switching elements S1, S1' ... is shifted by 360/n degrees in the above operation states 3 and 4. Thus, by shifting the operation time of each module and transferring energy to an output terminal "out," the output electric current and output power becomes higher and efficiency also becomes higher. At the same time, ripple currents of input and output can be decreased and an input EMI noise can be decreased. Further, an operating life of an electrolytic capacitor for output can be improved.

Fourth Embodiment

Figure 19:
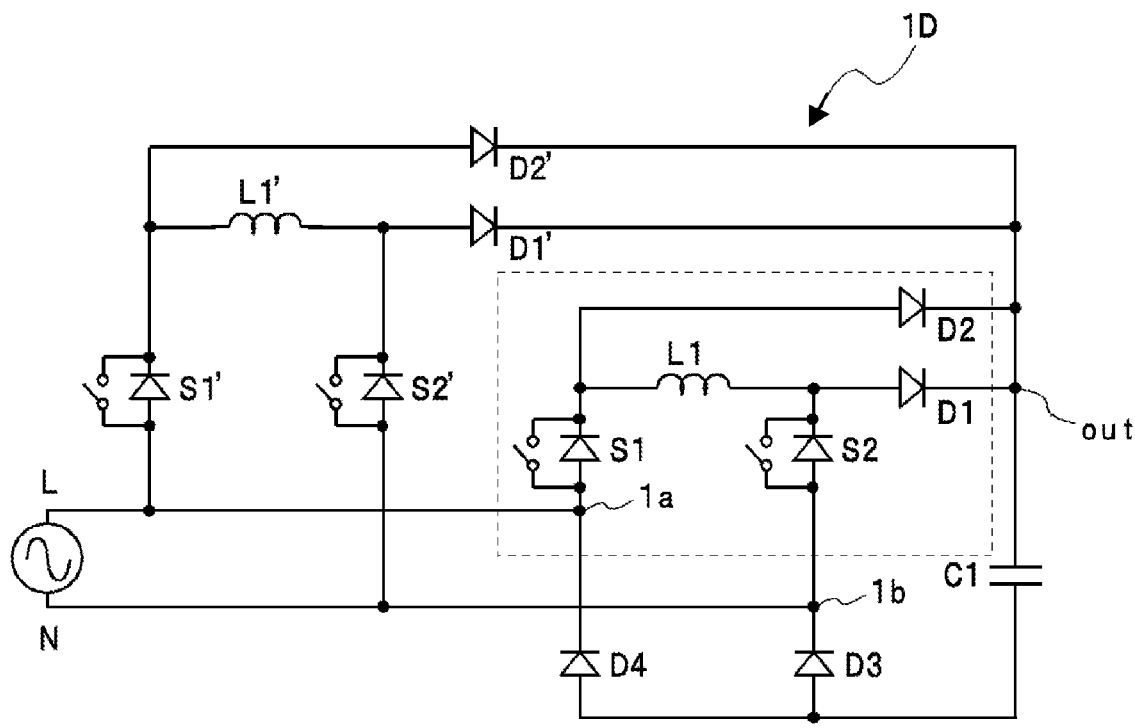
FIG. 19 is a circuit diagram of a power factor improvement circuit 1D according to a fourth embodiment of the present invention.

FIG. 19 shows a power factor improvement circuit 1D according to a fourth embodiment of the present invention. The power factor improvement circuit 1D according to the fourth embodiment has switching elements S1, S2 and diodes D4, D3 that are respectively connected in series. Each of power factor improvement circuit modules that are connected in parallel uses the diodes D3 and D4 in common. It is in this respect that the power factor improvement circuit 1D is mainly different from the power factor improvement circuit 1C according to the third embodiment of the present invention. That is, in the power factor improvement circuit 1D according to the fourth embodiment of the present invention, diodes D3' and D4' (as shown in the power factor improvement circuit 1C in FIGS. 17 and 18) are not independently provided in each of the power factor improvement circuits modules in FIG. 19. However, each module has the diodes D3 and D4 in common. As a result, as compared with the third embodiment, because the size of the power factor improvement circuits can be reduced by decreasing the number of devices therein, a large output electric current can be obtained.

Further, in the fourth embodiment, as an example, it is shown that the two power factor improvement circuit modules are connected in parallel. However, three or more power factor improvement circuit modules can also be connected in parallel. In this case, the diodes D3 and D4 can also be used in common. Therefore, an even larger electric current can be output.

In the fourth embodiment, when "n," which corresponds to an integer of 2 or more, of the power factor improvement circuit modules are connected in parallel, a phase of each of the switching elements S2, S2' ... is shifted by 360/n degrees in the above operation states 1 and 2 in the same manner as the third embodiment. In addition, a phase of each of the switching elements S1, S1' ... is shifted by 360/n degrees in the above operation states 3 and 4. Thus, by shifting operation time of each module and transferring energy to an output terminal "out," the output electric current and the output power becomes higher and efficiency also becomes higher.

Fifth Embodiment

Figure 20:
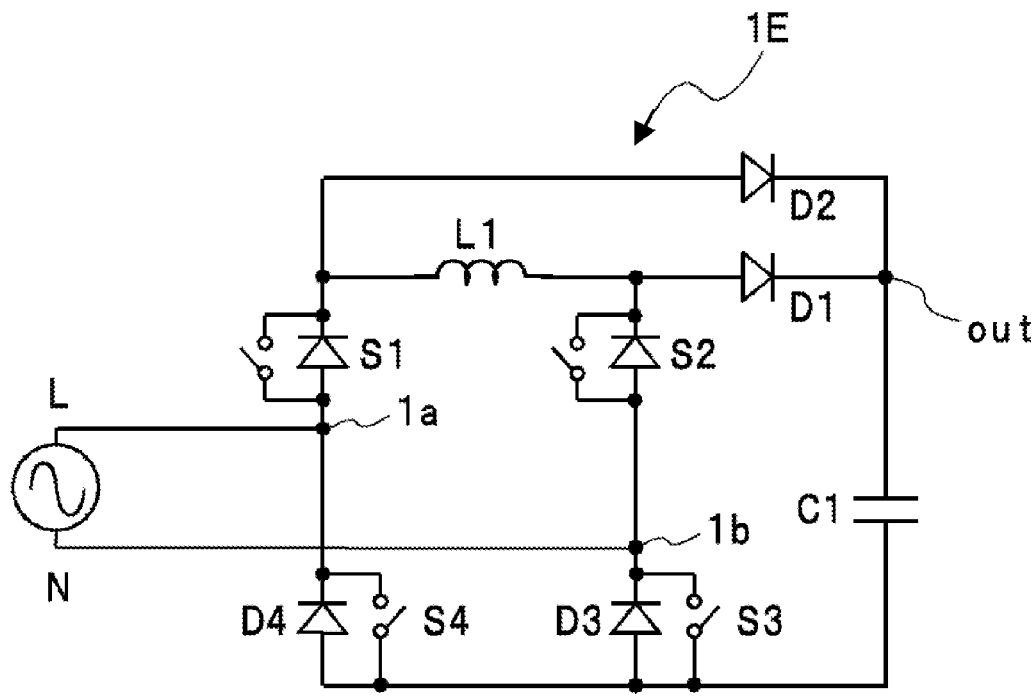
FIG. 20 is a circuit diagram of a power factor improvement circuit 1E according to a fifth embodiment of the present invention.

FIG. 20 shows a power factor improvement circuit 1E according to a fifth embodiment of the present invention. In the power factor improvement circuit 1E according to the fifth embodiment, switching elements S3 and S4 are respectively connected between both terminals of the diodes D3 and D4 in parallel. The switching elements S3 and S4 are controlled in synchronization with a frequency of an AC power source. It is in this respect that the power factor improvement circuit 1E is mainly different from the power factor improvement circuit 1A according to the first embodiment. The reasons for the above features are explained below. A switching characteristic, which is shown by the diodes D3 and D4 in the series circuits, corresponds to a frequency of the single-phase AC power source. In other words, the recovery times of the diodes D3 and D4 are the same as a half cycle with respect to the frequency of the single-phase AC power source. In the configuration explained above, the common-mode noise can be improved and a ground potential of a driving circuit can be relatively stable.

Further, the diodes D3 and D4 may be parasitic diodes of the switching elements S3 and S4. In this case, a loss in the diode can be further reduced and efficiency can be improved.

The power factor improvement circuit 1E according to the fifth embodiment can also be applied to the third and fourth embodiments explained above.

Sixth Embodiment

Figure 21:
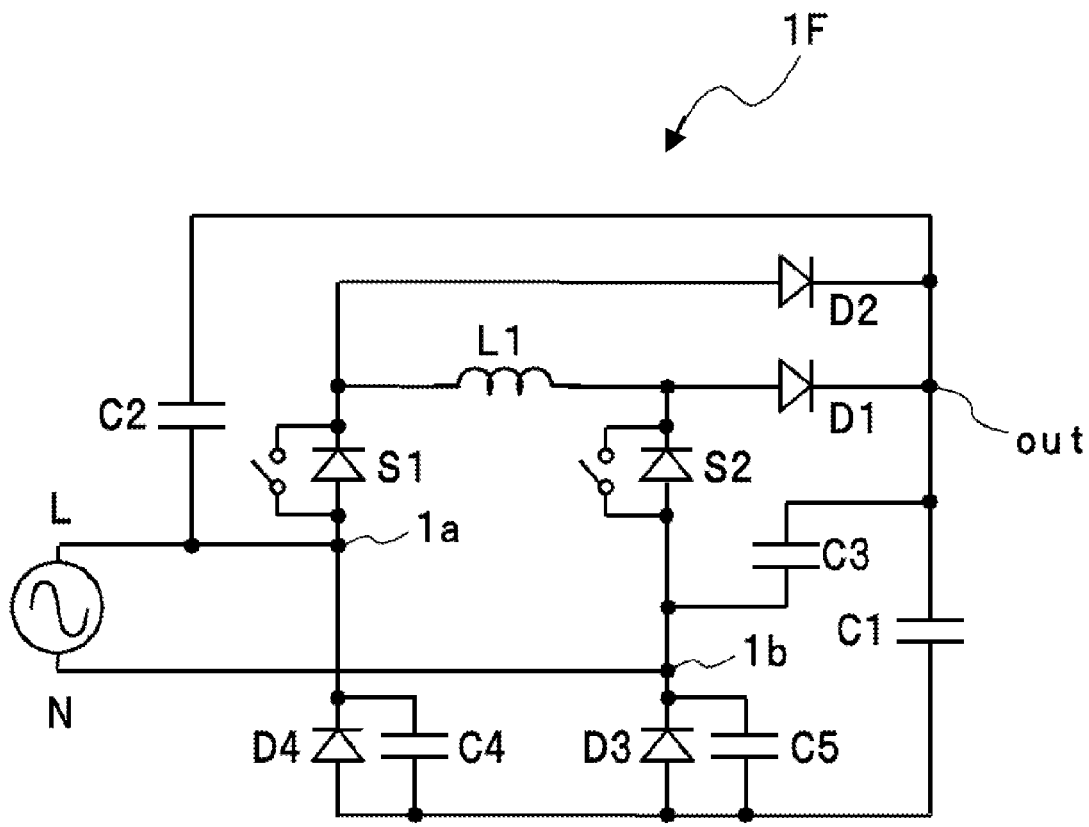
FIG. 21 is a circuit diagram of a power factor improvement circuit 1F according to a sixth embodiment of the present invention.

FIG. 21 shows a power factor improvement circuit 1F according to a sixth embodiment of the present invention. The power factor improvement circuit 1F according to the sixth embodiment is configured with at least one of the following additional elements: (1) a capacitor element C2; (2) a capacitor element C3; (3) a capacitor element C4; and (4) a capacitor element C5. Specifically, the capacitor element C2 is connected between the terminal L and the output terminal out. The capacitor element C3 is connected between the terminal N and the output terminal out. Further, the capacitor elements C4 and C5 are respectively connected between both terminals of the diodes D4 and D3 in the series circuits. It is in this respect that the power factor improvement circuit 1F according to the sixth embodiment of the present invention is mainly different from the power factor improvement circuit 1A according to the first embodiment.

The power factor improvement circuit 1F according to the sixth embodiment can reduce voltage variations of the AC power source and the diodes D3 and D4, because an electrical potential of the AC power source and the diodes D3 and D4 can be stabilized by providing at least one of the above capacitors C2, C3, C4 and C5. As a result, the common-mode noise can be further improved. In addition, a relative stability of a ground potential of the driving circuit can be realized.

The power factor improvement circuit 1F according to the sixth embodiment can also be applied to the third through fifth embodiments explained above.

Seventh Embodiment

Figure 22:
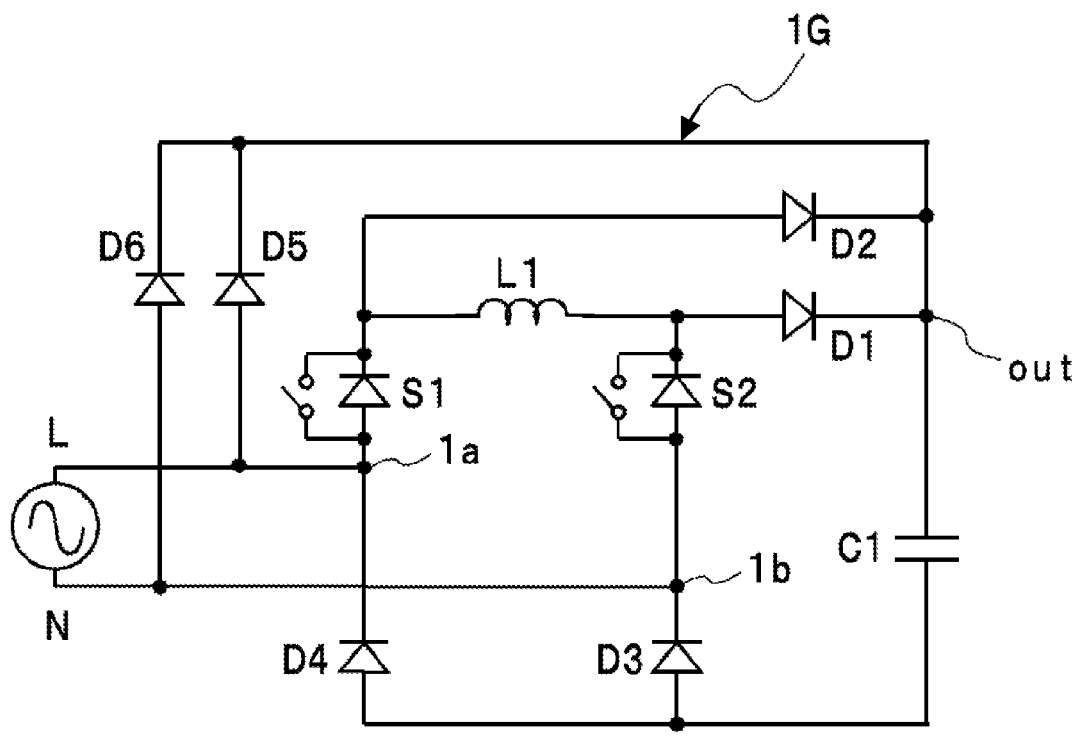
FIG. 22 is a circuit diagram of a power factor improvement circuit 1G according to a seventh embodiment of the present invention.

FIG. 22 shows a power factor improvement circuit 1G according to a seventh embodiment of the present invention. In addition to the configuration of the power factor improvement circuit 1A according to the first embodiment, the power factor improvement circuit 1G according to the seventh embodiment is also configured with diodes D5 and D6. Specifically, the diode D5 is connected between the terminal L and the output terminal out. Further, the diode D6 is connected between the terminal N and the output terminal out. It is in this respect that the power factor improvement circuit 1G according to the seventh embodiment of the present invention is mainly different from the power factor improvement circuit 1A according to the first embodiment.

In general, the switching elements S1, S2 and the diodes D1, D2 are weak to a rush current. Therefore, by further providing the diodes D5 and D6, the rush current is bypassed therethrough. As a result, the switching elements S1, S2 and the diodes D1, D2 can be protected.

The power factor improvement circuit being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

For instance, two examples are explained above with respect to a diode (rectifying element). One example corresponds to the first embodiment in which all of the switching elements have a parallel diode (parasitic or external). Another example corresponds to the second embodiment in which none of the switching elements have a parallel diode. However, an embodiment in which at least one of the switching elements has a parallel diode (parasitic or external) can also be applied to the present invention. Further, the above embodiments use a diode as a rectifying element. However, other elements that can rectify, such as a thyristor, can also be used.

What is claimed is:

1. A power factor improvement circuit, comprising:
a first series circuit in which a first switching element and a first rectifying element are serially connected;
a second series circuit in which a second switching element and a second rectifying element are serially connected;
a single-phase alternating current power source that has first and second input terminals, the first input terminal being connected to a first node between the first switching element and the first rectifying element, the second input terminal being connected to a second node between the second switching element and the second rectifying element;
an inductor element that is connected between a terminal of the first switching element and a terminal of the second switching element, the terminal of the first switching element being on the other side of the first node, and the terminal of the second switching element being on the other side of the second node;
a third rectifying element that is connected between the terminal of the first switching element and an output terminal;
a fourth rectifying element that is connected between the terminal of the second switching element and the output terminal; and
a first capacitor element that is connected between a terminal of the first rectifying element and the output terminal, the first capacitor also being connected between a terminal of the second rectifying element and the output terminal, the terminal of the first rectifying element being on the other side of the first node, and the terminal of the second rectifying element being on the other side of the second node.

2. The power factor improvement circuit, according to claim 1, wherein
the first switching element does not include a diode; and
the second switching element does not include a diode.

3. The power factor improvement circuit, according to claim 1, wherein
the first switching element includes a diode; and
the second switching element includes a diode.

4. The power factor improvement circuit, according to claim 1, wherein
when a first voltage of the first input terminal is higher than a second voltage of the second input terminal, the first switching element is in a conductive state and the second switching element performs a switching operation by alternating conductive and non-conductive states thereof according to an operating frequency.

5. The power factor improvement circuit, according to claim 1, wherein
when a first voltage of the first input terminal is higher than a second voltage of the second input terminal, the first switching element is in a non-conductive state and the second switching element performs a switching operation by alternating conductive and non-conductive states thereof according to an operating frequency.

6. The power factor improvement circuit, according to claim 1, wherein
the first and second switching elements perform a switching operation by alternating conductive and non-conductive states thereof according to an operating frequency.

7. The power factor improvement circuit, according to claim 1, wherein
first and second reverse recovery times of the first and second rectifying elements, respectively, are longer than third and fourth reverse recovery times of the third and fourth rectifying elements.

8. The power factor improvement circuit, according to claim 1, wherein
first and second switching characteristics of the first and second rectifying elements, respectively, correspond to a frequency of the single-phase alternating current power source.

9. The power factor improvement circuit, according to claim 1, further comprising:
first and second control switching elements that are respectively connected to the first and second rectifying elements in parallel, wherein
the first and second control switching elements are controlled in synchronization with a frequency of the single-phase alternating current power source.

10. The power factor improvement circuit, according to claim 1, further comprising:
at least one of a second capacitor that is connected between the first input terminal and the output terminal, a third capacitor that is connected between the second input terminal and the output terminal, a fourth capacitor that is connected between both ends of the first rectifying element in parallel, and a fifth capacitor that is connected between both ends of the second rectifying element in parallel.

11. A power factor improvement circuit, comprising:
a first circuit; and
at least one other circuit that is connected in parallel to the first circuit, each of the first circuit and the at least one other circuit including:
a first series circuit in which a first switching element and a first rectifying element are serially connected;
a second series circuit in which a second switching element and a second rectifying element are serially connected;
a single-phase alternating current power source that has first and second input terminals, the first input terminal being connected to a first node between the first switching element and the first rectifying element, the second input terminal being connected to a second node between the second switching element and the second rectifying element;

an inductor element that is connected between a terminal of the first switching element and a terminal of the second switching element, the terminal of the first switching element being on the other side of the first node, and the terminal of the second switching element being on the other side of the second node;

a third rectifying element that is connected between the terminal of the first switching element and an output terminal;

a fourth rectifying element that is connected between the terminal of the second switching element and the output terminal; and a first capacitor element that is connected between a terminal of the first rectifying element and the output, the first capacitor also being connected between a terminal of the second rectifying element and the output, the terminal of the first rectifying element being on the other side of the first node, and the terminal of the second rectifying element being on the other side of the second node.

12. The power factor improvement circuit, according to claim 11, wherein the first circuit and the at least one other circuit commonly use the first and second rectifying elements.

13. The power factor improvement circuit, according to claim 11, wherein:

a total of the first circuit and the at least one other circuit is n; and a phase of an operation frequency of each of the n circuits is shifted by 360/n degrees.

* * * * *